(12) United States Patent
Chen et al.

(10) Patent No.: US 10,200,845 B2
(45) Date of Patent: Feb. 5, 2019

(54) D2D SIGNAL DETECTING METHOD AND DEVICE

(71) Applicant: CHINA ACADEMY OF TELECOMMUNICATIONS TECHNOLOGY, Beijing (CN)

(72) Inventors: Wenhong Chen, Beijing (CN); Quibin Gao, Beijing (CN); Ying Peng, Beijing (CN); Rui Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/102,475

(22) PCT Filed: Dec. 4, 2014

(86) PCT No.: PCT/CN2014/093030
§ 371 (c)(1),
(2) Date: Jun. 7, 2016

(87) PCT Pub. No.: WO2015/081871
PCT Pub. Date: Jun. 11, 2015

(65) Prior Publication Data
US 2016/0316352 A1    Oct. 27, 2016

(30) Foreign Application Priority Data
Dec. 6, 2013   (CN) .......................... 2013 1 0658748

(51) Int. Cl.
*H04W 8/00*   (2009.01)
*H04W 4/06*   (2009.01)
(Continued)

(52) U.S. Cl.
CPC ............. *H04W 8/005* (2013.01); *H04W 4/06* (2013.01); *H04W 72/042* (2013.01); *H04W 76/14* (2018.02)

(58) Field of Classification Search
CPC ... H04W 4/06; H04W 72/042; H04W 76/023; H04W 8/005; H04W 48/16; H04L 27/0006; H04L 27/2602; H04L 5/0037
See application file for complete search history.

(56) References Cited

U.S. PATENT DOCUMENTS

2012/0269115 A1   10/2012   Esteves et al.
2013/0303223 A1*  11/2013   Patil ..................... H04W 8/005
                                                      455/517
(Continued)

FOREIGN PATENT DOCUMENTS

CN      101167322 A      4/2008
CN      103179669 A      6/2013
(Continued)

OTHER PUBLICATIONS

International Search Report of PCT/CN2014/093030.
(Continued)

*Primary Examiner* — Awet Haile
(74) *Attorney, Agent, or Firm* — Kilpatrick Townsend & Stockton LLP

(57) ABSTRACT

Disclosed are a D2D signal detecting method and device, comprising: a user equipment determines a physical resource for discovery signal detection; the user equipment determines the number of discovery resources used by the discovery signals according to the physical resource area for discovery signal detection, or according to a discovery resource set of the discovery sequence contained in the discovery signal detected in the physical resource area, the number of discovery resources being the number of discovery resources used in one discovery period or in the physical
(Continued)

resource area for sending the same discovery signal; the user equipment detects the discovery signals according to the determined number of discovery resources. The present invention can improve performance loss caused by D2D signal detection and can reduce the complexity of D2D signal detection by user equipment.

12 Claims, 3 Drawing Sheets

(51) Int. Cl.
*H04W 72/04* (2009.01)
*H04W 76/14* (2018.01)

(56) References Cited

U.S. PATENT DOCUMENTS

| | | | | |
|---|---|---|---|---|
| 2014/0153538 A1* | 6/2014 | Kuo | ...................... | H04W 48/16 370/330 |
| 2014/0254429 A1* | 9/2014 | Wang | ................... | H04L 5/0037 370/254 |
| 2015/0131571 A1* | 5/2015 | Fodor | ................... | H04W 4/005 370/329 |

FOREIGN PATENT DOCUMENTS

| | | |
|---|---|---|
| CN | 103338497 A | 10/2013 |
| CN | 102857901 A | 3/2014 |
| CN | 103118417 A | 7/2014 |
| KR | 20130040749 A | 4/2013 |
| WO | 2013006652 A1 | 1/2013 |
| WO | 2013049959 A1 | 4/2013 |
| WO | 2013062310 A1 | 5/2013 |

OTHER PUBLICATIONS

Huawei et al: "PHY consi derations for discovery signal design", 3GPP Draft; R1-132413, 3rd Generation Partnership Project (3GPP), Mobile Competence Centre ; 650, Route Des Lucioles; F-06921 Sophia-Antipolis Cedex; France vol. RAN WG1, no. Fukuoka, Japan; May 20, 2013-May 24, 2013 May 11, 2013 (May 11, 2013), XP050698177, Retrieved from the Internet: URL: http://www.3gpp.org/ftp/tsg_ran/WG1_RL1/TSGR1_73/Docs/ [retrieved on May 11, 2013].

Huawei et al: "Near-far mitigation for D2D discovery", 3GPP Draft; R1-135530, 3rd Generation Partnership Project {3GPP), Mobile Competence Centre ; 650, Route Des Lucioles ; F-06921 Sophia-Antipolis Cedex; France vol. RAN WG1, no. San Francisco, USA; Nov. 11, 2013-Nov. 15, 2013 Nov. 1, 2013 {Nov. 1, 2013), XP050750699, Retrieved from the Internet: URL:http://www.3gpp.org/ftp/tsg_ran/WG1_RL1/TSGR1_75/DOCS/ [retrieved on Nov. 1, 2013].

General Dynamics Broadband UK; "ProSe device-to-device discovery sequence design", 3 GPP Draft; R1-135496_D2D_ DISCOVERY_SEQUENCE_GDBUK, 3rd Generation Partnership Project {3GPP), Mobile Competence Centre; 650, Route Des Lucioles ; F-06921 Sophia-Antipolis Cedex; France, vol. RAN WG1, no. San Francisco, USA; Nov. 11, 2013-Nov. 15, 2013 Nov. 1, 2013 (Nov. 1, 2013), XP050750695, Retrieved from the Internet: URL: http://www.3gpp.org/ftp/tsg_ran/WG1_RL1/TSGR1_75/Docs/ [retrieved on Nov. 1, 2013].

* cited by examiner

D2D SIGNAL DETECTING METHOD AND DEVICE

This application is a US National Stage of International Application No.PCT/CN2014/093030, filed on Dec. 04, 2014, designating the United States, and claiming priority to Chinese Patent Application No. 201310658748.6, filed with the Chinese Patent Office on Dec. 6, 2013 and entitled "Method and device for detecting a D2D signal", which is hereby incorporated by reference in its entirety.

FIELD

The present invention relates to the field of wireless communications and particularly to a method and device for detecting a D2D signal.

BACKGROUND

Device to Device (D2D) communication refers to direct communication between user equipments, where the adjacent user equipments can transmit data over a direct link in a short-distance range, without a central node (i.e., an eNB) to forward the data.

The Long Term Evolution (LTE) D2D technology refers to D2D discovery and communication processes, controlled by an LTE network, operating in an LTE licensed frequency band. The LTE technology will evolve from the pure wireless mobile cellular communication technology toward a "universal connectivity technology" due to the introduction of the LTE D2D feature.

The LTE D2D technology includes two aspects of a D2D discovery and D2D communication, where the D2D discovery refers to that one D2D user equipment discovers another D2D UE nearby. The discovery between the D2D user equipments is realized using a discovery signal, the discovery signal includes two components of a discovery sequence and a discovery message, where the discovery message can carry some identification information, e.g., device information, application information, a service type, etc., and the discovery user equipment (i.e., the user equipment receiving the discovery signal) identifies the discovered user equipment (i.e., the user equipment transmitting the discovery signal) using such information. The discovery message in the discovery signal is carried over a discovery resource, where a full discovery message can be transmitted over a discovery resource which is generally a physical resource including Physical Resource Blocks (PRBs).

In the D2D discovery process, the D2D user equipment needs to know both a receive resource region in which the discovery signal of the other D2D user equipment is received, and a transmit resource region in which the discovery signal of itself is transmitted, but the D2D user equipment may not transmit and receive the discovery signals concurrently in a sub-frame due to a hardware constraint. In general, discovery resources of the system include a set of sub-frames or a set of PRBs, and the periodicity at which the set of sub-frames or the set of PRBs occurs, where the periodicity refers to a discovery periodicity of the system, as illustrated in FIG. 1. A discovery periodicity of the system may include several sub-frames, each of which includes several PRBs, and generally these sub-frames or PRBs in the coverage area of the network are consecutive uplink or downlink cellular resources (e.g., consecutive uplink sub-frames). The discovery resources are generally configured by the eNB in the coverage area of the network, and are predefined, or are configured by a cluster head beyond the coverage area of the network.

In each discovery periodicity, D2D user equipment may detect the discovery signal of the other D2D user equipments in sub-frame(s) in which no discovery signal is transmitted. Also in each discovery periodicity, the D2D user equipment may transmit a discovery message over a discovery resource, or may transmit a number of same or different discovery messages over a number of discovery resources. A discovery sequence and a discovery message included in a discovery signal may be transmitted over the same discovery resource, or may be transmitted over different discovery resources, but generally the discovery sequence is transmitted together with the discovery message in a discover periodicity. If there are a plurality of discovery sequences, then the sequences will be detected respectively at the receiver to determine the currently used discovery sequence.

In the prior art, the user equipment can not determine the number of discovery resources for the transmitter, and consequently can not detect for the number of discovery resources, thus resulting a potential loss of performance due to a mismatching number of discovery resources; and if the user equipment detects blindly for all the possible numbers of discovery resources, then the complexity of detection may be increased.

SUMMARY

Embodiments of the invention provide a method and device for detecting a D2D signal so as to improve the loss of performance.

An embodiment of the invention provides a method for detecting a D2D signal, the method including:

determining, by a user equipment, a physical resource region in which a discovery signal is detected;

determining, by the user equipment, the number of discovery resources for the discovery signal according to the determined physical resource region in which the discovery signal is detected, or according to a set of discovery resources in which a discovery sequence included in the discovery signal is detected in the physical resource region, wherein the number of discovery resources refers to the number of discovery resources occupied by a same discovery signal transmitted in a discovery periodicity or in the physical resource region; and detecting, by the user equipment, the discovery signal according to the determined number of discovery resources.

Further to the method above, the physical resource region refers to a set of sub-frames or a set of sub-bands or a set of PRBs.

Further to the method above, the discovery resources refer to physical resources occupied by the discovery signal transmitted once.

Further to the method above, if the number of discovery resources of the discovery signal is more than 1, then the user equipment and a user equipment transmitting the discovery signal prescribe a physical resource mapping relationship between the discovery resources occupied by the discovery signal.

Further to the method above, determining, by the user equipment, the number of discovery resources for the discovery signal according to the physical resource region in which the discovery signal is detected includes: determining, by the user equipment, the number of discovery resources of the discovery signal in the physical resource region in which the discovery signal is detected, according to a correspondence relationship between the number of discovery resources and the physical resource region.

Here the correspondence relationship between the number of discovery resources and the physical resource region is notified by a network device to the D2D user equipment in downlink signaling or a broadcast message; or the correspondence relationship between the number of discovery resources and the physical resource region is prescribed by the user equipment and a user equipment transmitting the discovery signal.

Further to the method above, determining, by the user equipment, the number of discovery resources for the discovery signal according to the set of discovery resources in which the discovery sequence included in the discovery signal is detected in the physical resource region includes:

determining, by the user equipment, the number of discovery resources in the set of discovery resources in which the discovery sequence included in the discovery signal is detected, as the number of discovery resources for the discovery signal; or if the number of discovery resources in a set of discovery resources in which the discovery sequence included in the discovery signal is detected, is N, then selecting K values from the values ranging from 1, inclusive, to N, inclusive, and determining the K values as possible values of the number of discovery resources for the discovery signal, wherein K is an integer more than or equal to 1 and less than or equal to N, and N is more than 1.

Here selecting the K values from the values ranging from 1, inclusive, to N, inclusive, and determining the K values as the possible values of the number of discovery resources for the discovery signal includes: selecting, by the user equipment, K values, included in a predefined set S of possible values of the number of discovery resources, from the values ranging from 1, inclusive, to N, inclusive, and determining the K values as possible values of the number of discovery resources for the discovery signal.

Further to the method above, detecting, by the user equipment, the discovery signal according to the determined number of discovery resources includes: if the user equipment determines the number of discovery resources of the discovery signal as a single value, then detecting the discovery message of the discovery signal in the physical resource region based upon the single value of the number of discovery resources; or if the user equipment determines the number of discovery resources of the discovery signal as a plurality of possible values, then detecting the discovery message of the discovery signal in the physical resource region respectively based upon each of the possible values.

Further to the method above, detecting, by the user equipment, a discovery message of the discovery signal in the physical resource region according to the number of discovery resources includes:

if the value of the number of discovery resources is 1, then detecting the discovery message of the discovery signal separately on each discovery resource in the physical resource region; or if the value of the number of discovery resources is M, wherein M is more than 1, then detecting the discovery message of the discovery signal jointly on the M discovery resources in the physical resource region.

An embodiment of the invention provides a user equipment including:

a first determining module configured to determine a physical resource region in which a discovery signal is detected;

a second determining module configured to determine the number of discovery resources for the discovery signal according to the physical resource region, determined by the first determining module, in which the discovery signal is detected, or according to a set of discovery resources in which a discovery sequence included in the discovery signal is detected in the physical resource region, wherein the number of discovery resources refers to the number of discovery resources in which the same discovery signal is transmitted in a discovery periodicity or in the physical resource region; and a detecting module configured to detect the discovery signal according to the determined number of discovery resources.

Further to the user equipment above, the physical resource region refers to a set of sub-frames or a set of sub-bands or a set of PRBs.

Further to the user equipment above, the discovery resources refer to physical resources occupied by the discovery signal transmitted once.

Further to the user equipment above, the user equipment further includes a storing module configured to store a physical resource mapping relationship between the discovery resources occupied by the discovery signal, which is prescribed by a user equipment transmitting the discovery signal if the number of discovery resources of the discovery signal is more than 1.

Further to the user equipment above, the second determining module is configured to determine the number of discovery resources of the discovery signal in the physical resource region in which the discovery signal is detected according to a correspondence relationship between the number of discovery resources and the physical resource region.

Further to the user equipment above, the user equipment further includes: a storing module configured to store the correspondence relationship between the number of discovery resources and the physical resource region, wherein the correspondence relationship between the number of discovery resources and the physical resource region is notified by a network device to the D2D user equipment in downlink signaling or a broadcast message; or the correspondence relationship between the number of discovery resources and the physical resource region is prescribed by the user equipment and a user equipment transmitting the discovery signal.

Further to the user equipment above, the second determining module is configured to determine the number of discovery resources in the set of discovery resources in which the discovery sequence included in the discovery signal is detected, as the number of discovery resources for the discovery signal; or if the number of discovery resources in a set of discovery resources in which the discovery sequence included in the discovery signal is detected, is N, to select K values from the values ranging from 1, inclusive, to N, inclusive, and to determine the K values as possible values of the number of discovery resources for the discovery signal, wherein K is an integer more than or equal to 1 and less than or equal to N, and N is more than 1.

Here the second determining module is configured to select K values, included in a predefined set S of possible values of the number of discovery resources, from the values ranging from 1, inclusive, to N, inclusive, and to determine the K values as possible values of the number of discovery resources for the discovery signal.

Further to the user equipment above, the detecting module is configured, if the second determining module determines the number of discovery resources of the discovery signal as a single value, to detect a discovery message of the discovery signal in the physical resource region according to the single value of the number of discovery resources; or if the second determining module determines the number of discovery resources of the discovery signal as a number of possible values, to detect the discovery message of the discovery signal in the physical resource region respectively according to each of the possible values.

Here the detecting module is configured, if the value of the number of discovery resources is 1, to detect the discovery message of the discovery signal separately on each discovery resource in the physical resource region; or if the value of the number of discovery resources is M, wherein M is more than 1, to detect the discovery message of the discovery signal jointly on the M discovery resources in the physical resource region.

In the embodiments above of the invention, the user equipment can determine the number of discovery resources for the discovery signal, and detect the discovery signal according to the number of discovery resources without detecting blindly for all the possible numbers of discovery resources, thus improving the loss of performance over the prior art. Furthermore the complexity of detection by the user equipment can be lowered as well. Furthermore the instances of the same discovery signal received over the discovery resources can be combined to thereby improve the performance of signal transmission.

BRIEF DESCRIPTION OF THE DRAWINGS

In order to make the technical solutions according to the embodiments of the invention more apparent, the drawings to which reference is made in the description of the embodiments will be described below briefly, and apparently the drawings described below are merely illustrative of some of the embodiments of the invention, and those ordinarily skilled in the art can further derive other drawings from these drawings without any inventive effort. In the drawings.

DETAILED DESCRIPTION OF THE EMBODIMENTS

The embodiments of the invention provide a solution to detection of a D2D signal, and in the embodiments of the invention, a D2D user equipment determines the number of discovery resources for a discovery signal according to physical resources in which the discovery signal is detected, or a result of detecting a discovery sequence, and detects the discovery signal according to the number of resource number.

The embodiments of the invention will be described below in details with reference to the drawings.

Figure 1:
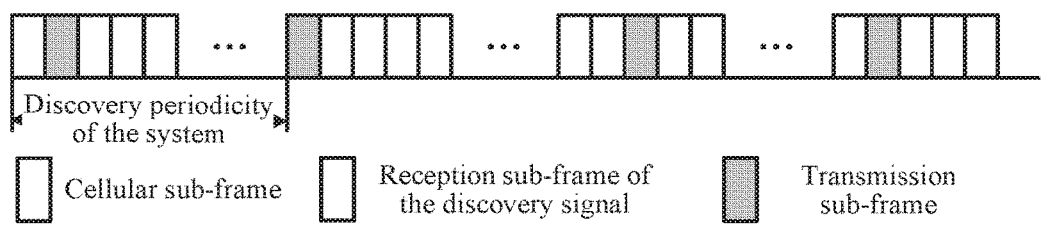
FIG. 1 is a schematic diagram of discovery resources of a D2D user equipment in the prior art.
Figure 2:
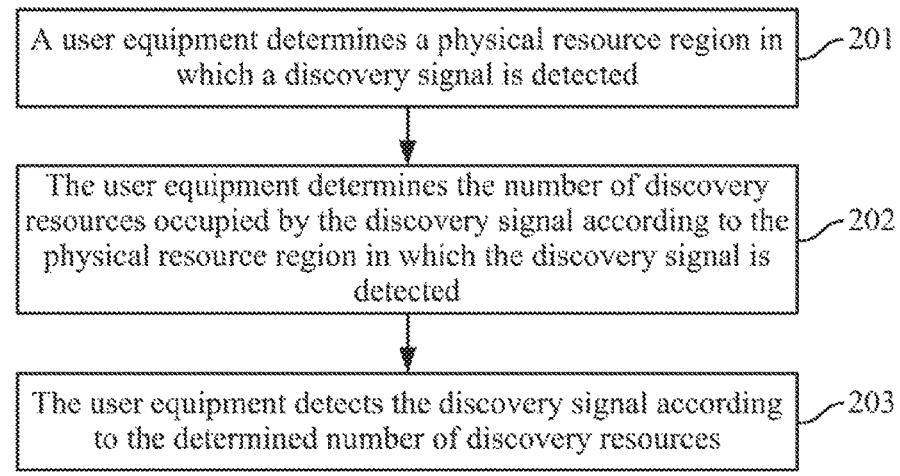
FIG. 2 is a schematic flow chart of detecting a D2D signal according to an embodiment of the invention.

Referring to FIG. 2 which is a schematic flow chart of detecting a D2D signal according to an embodiment of the invention, the flow can include:

Step 201: a user equipment determines a physical resource region in which a discovery signal is detected.

The user equipment here refers to a discovering user equipment, i.e., a user equipment receiving the discovery signal. The discovery signal here can include a discovery sequence and/or a discovery message.

The physical resource region of the discovery signal refers to a set of sub-frames or a set of sub-bands or a set of PRBs of the discovery signal.

It shall be noted that the physical resource region can be a set of sub-bands or a set of Physical Resource Blocks (PRBs) in the frequency domain, and a set of sub-frames in the time domain, that is, a physical resource region actually can be a receive physical resource pool including some frequency resources and time resources.

Specifically the user equipment knows the physical resource region by receiving downlink control signaling, indicating the physical resource region, sent from an eNB, or the user equipment determines a predefined physical resource region for transmitting or receiving the discovery signal as the physical resource region in which the discovery signal is detected.

Step 202, the user equipment determines the number of discovery resources occupied by the discovery signal in the physical resource region in which the discovery signal is detected.

The discovery resources refer to physical resources occupied by the discovery signal transmitted once. The number of discovery resources occupied by the discovery signal refers to the number of discovery resources occupied by the same discovery signal transmitted in a discovery periodicity or in the physical resource region, where the number of discovery resources is an integer more than or equal to 1.

Preferably the step 202 can be performed as follows: the user equipment determines the number of discovery resources of the discovery signal in the physical resource region in which the discovery signal is detected, according to a correspondence relationship between the number of discovery resources and the physical resource region.

Preferably the correspondence relationship between the number of discovery resources and the physical resource region can be notified by a network device to the user equipment in downlink signaling or a broadcast message; or the correspondence relationship between the number of discovery resources and the physical resource region can be prescribed by the user equipment and a user equipment transmitting the discovery signal.

For example, the network device can notify the D2D user equipment of the number of discovery resources corresponding to each physical resource region to be detected, in the downlink signaling or broadcast signaling.

The different number of discovery resources corresponds to a different physical resource region in the correspondence relationship between the number of discovery resources and the physical resource region. Preferably the different number of discovery resources corresponds to a different sub-frame. For example the following prescription can be made: the number of discovery resources corresponding to first two discovery sub-frames in a discovery periodicity is equal to 2, and the number of discovery resources corresponding to other discovery sub-frames than the first two discovery sub-frames in the discovery periodicity is equal to 1, for example the third discovery sub-frame, the number of discovery resource corresponding to the third discovery sub-frame is equal to 1.

Step 203: the user equipment detects the discovery signal according to the determined number of discovery resources.

Preferably the user equipment can detect the discovery signal according to the determined number of discovery resources in one of the following approaches dependent upon different values of the numbers of discovery resources:

In an approach A, if the value of the number of discovery resources is 1, then the discovery signal will be detected separately on each discovery resource in the physical resource region.

For example, if the value of the number of discovery resources of the discovery signal, which is determined corresponding to the third discovery sub-frame in the discovery periodicity, is 1, then the discovery signal will be detected separately on each discovery resource in the third discovery sub-frame in each discovery periodicity.

In an approach B, if the value of the number of discovery resources is M, where M is more than 1, then the discovery signal will be detected jointly on M discovery resources in the physical resource region.

Particularly if the number of discovery resources of the discovery signal is more than 1, then the user equipment and the user equipment transmitting the discovery signal may prescribe a physical resource mapping relationship between the discovery resources occupied by the discovery signal. Thus when the discovery signal is detected in the approach B, if the value of the number of discovery resources of the discovery signal, which is determined by the user equipment is M (M>1), then the discovery message of the discovery signal will be detected jointly on the M discovery resources of the discovery signal according to the physical resource mapping relationship between the discovery resources occupied by the discovery signal. In a particular implementation, soft bits of the discovery message detected on the M discovery resources can be combined as a final detection result.

By way of an example, if two discovery resources are occupied by a discovery signal x, where the two discovery resources occupy PRBs in two adjacent sub-frames, and particularly there are fixed frequency hopping patterns for the PRBs occupied in the two sub-frames, then a physical resource mapping relationship between the two discovery resources of the discovery signal x is preconfigured for the discovery signal on the user equipment. Thus the discovery signal x can be detected by combining soft bits of a discovery message detected on the PRBs in these two adjacent sub-frames as a result of detecting the discovery signal x.

In an application scenario, still taking as an example the predetermined correspondence relationship between the number of discovery resources and the physical resources, if the number of discovery resources corresponding to the first two discovery sub-frames in the discovery periodicity is equal to 2, and the number of discovery resources corresponding to the other discovery sub-frames than the first two discovery sub-frames in the discovery periodicity is equal to 1, then in the steps 201 and 202, the user equipment determines the number of discovery resources as 2 for the first discovery sub-frame, and the number of discovery resources as 2 for the second discovery sub-frame, in a discovery periodicity. Thus in the step 203, the user equipment can detect the discovery signal according to the values of the number of discovery resources being equal to 2 in the first discovery sub-frame and the second discovery sub-frame, and detect the discovery signal according to the number of discovery resources being equal to 1 in the other discovery sub-frames, in the discovery periodicity.

As can be apparent from the description above, the user equipment can know the number of discovery resources occupied by the target discovering user equipment to thereby detect the discovery signal according to the number of discovery resources. A gain of information combination can be obtained from the discovery resources, and the need of blind detection for all the possible number of discovery resources can be avoided to thereby lower the complexity of detection.

Figure 3:
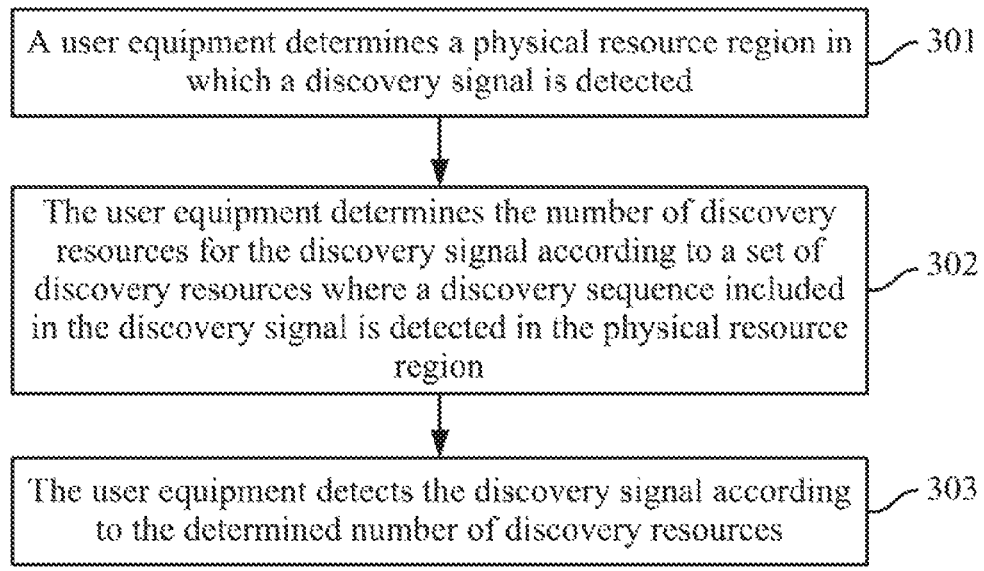
FIG. 3 is a schematic flow chart of detecting a D2D signal according to another embodiment of the invention.

Referring to FIG. 3 which is a schematic flow chart of detecting a D2D signal according to another embodiment of the invention, the flow can include:

Step 301: a user equipment determines a physical resource region in which a discovery signal is detected.

The user equipment here refers to a discovering user equipment, i.e., a user equipment receiving the discovery signal. The discovery signal here includes at least a discovery sequence and optionally a discovery message. A discovery sequence of a discovery signal can be a unique sequence or can be a plurality of candidate sequences, and in the latter case, the user equipment needs to detect each of the candidate sequences respectively.

The physical resource region of the discovery signal refers to a set of sub-frames or a set of sub-bands or a set of PRBs of the discovery signal.

The discovery resources refer to physical resources occupied by the discovery signal transmitted once. The number of discovery resources occupied by the discovery signal refer to the number of discovery resources occupied by the same discovery signal transmitted in a discovery periodicity or in the physical resource region, where the numbers of discovery resources are integers more than or equal to 1.

In this step, the physical resource region determined by the user equipment includes several discovery resources in a discovery periodicity, that is, the user equipment detects the discovery sequence of the discovery signal on the several discovery resources in the discovery periodicity. For example, the physical resource region can include all the discovery resources in the discovery periodicity, or discovery resources in several sub-frames in the discovery periodicity, or discovery resources in several sub-bands in the discovery periodicity. Particularly the user equipment can traverse all the possible discovery sequences of the discovery signal, correlate them with signals received on the respective discovery resources, and detect the discovery sequence. For example, the user equipment detects the discovery sequence of the discovery signal in the several discovery sub-frames in the discovery periodicity.

Preferably a mapping relationship between physical resources of a plurality of discovery resources of the same discovery signal is prescribed on the user equipment so that during the user equipment detects the discovery sequence of the discovery signal, upon detecting the discovery sequence, the user equipment may detect the discovery sequence on other discovery resources where the discovery sequence may exist, according to the mapping relationship. Specifically the user equipment can correlate the signal generated from the discovery sequence with the received signals on other discovery resources where the discovery sequence may exist, to determine whether the discovery sequence exists on the respective discovery resources.

By way of an example, if the user equipment detects some discovery sequence 1 on a discovery resource 1, then it may detect the discovery sequence on other discovery resources where the discovery sequence may exist, where there is a prescribed resource mapping relationship between the other discovery resources where the discovery sequence may exist, and the discovery resource 1, for example, they occupy the same PRBs in other discovery sub-frames than the discovery resource 1. Particularly the UE can correlate a signal generated from the discovery sequence 1 with signals received in the same PRBs in the other discovery sub-frames, and determine from a correlation result whether the discovery sequence exists on the physical resources.

Step 302: the user equipment determines the number of discovery resources for the discovery signal according to a set of discovery resources where the discovery sequence included in a discovery signal is detected in the physical resource region.

The number of discovery resources refers to the number of discovery resources occupied by a single discovery signal transmitted in a discovery periodicity.

Preferably the user equipment can determine the number of discovery resources for the discovery signal in one of the following approaches:

In a first approach, the user equipment determines the number of discovery resources in the set of discovery resources in which the discovery sequence included in the discovery signal is detected, as the number of discovery resources for the discovery signal. By way of an example, if the user equipment detects a discovery sequence of some discovery signal in two sub-frames in a discovery periodicity, then the user equipment determines the number of discovery resources for the discovery signal as 2. By way of another example, if the user equipment detects a discovery sequence of some discovery signal in four PRBs in a discovery periodicity, then the user equipment determines the number of discovery resources for the discovery signal as 4.

In a second approach, if the user equipment determines the number of discovery resources in the set of discovery resources in which the discovery sequence included in the discovery signal is detected, as N, then the user equipment selects K values from the values ranging from 1, inclusive, to N, inclusive, and determine the K values as possible values of the number of discovery resources for the discovery signal, where K is an integer more than or equal to 1 and less than or equal to N, and N is more than 1. By way of an example, if the user equipment detects a discovery sequence of some discovery signal in two sub-frames in a discovery periodicity, then the user equipment selects 1 and 2 in the interval of values [1, 2] as possible values of the number of discovery resources for the discovery signal. By way of another example, if the user equipment detects some discovery signal in four PRBs in a discovery periodicity, then the user equipment the user equipment may select 1, 2 and 4 in the interval of values [1, 4] as possible values of the number of discovery resources for the discovery signal.

Preferably the user equipment can select the K values from the values ranging from 1, inclusive, to N, inclusive by determining all the integers in the range of values as the number of discovery resources for the discovery signal, or by selecting K values, included in a predefined set S of possible values of the number of discovery resources, from the values ranging from 1, inclusive, to N, inclusive, and determining the K values as possible values of the number of discovery resources for the discovery signal. For example, given the set S={1, 2, 4}, the three values 1, 2 and 4 can be selected in this case as the number of discovery resources for the discovery signal. In another example, if the selected number of discovery resources is prescribed as 1, 2 and 4, where N=2 (N represents the number of discovery resources in the set of discovery resources), then the two values 1 and 2 may be selected in the range of values [1, 2] as the number of discovery resources for the discovery signal.

Step 303: the user equipment detects the discovery signal according to the determined number of discovery resources.

Preferably the user equipment can detect the discovery signal according to the determined number of discovery resources in one of the following schemes:

In a first detection scheme, if the user equipment determines the number of discovery resources of the discovery signal as a single value, then the user equipment may detect a discovery message of the discovery signal in the physical resource region according to the single value of the number of discovery resources.

By way of an example, if the user equipment determines the number of discovery resources as 2, then the user equipment may detect a discovery message of the discovery signal in the physical resource region according to the number of discovery resources (i.e., 2).

In a second detection scheme, if the user equipment determines the number of discovery resources of the discovery signal as a plurality of possible values, then the user equipment may detect the discovery message of the discovery signal in the physical resource region respectively according to each of the possible values.

By way of an example, if the user equipment determines that the number of discovery resources includes 1, 2 and 4, then the user equipment may firstly detect a discovery message of the discovery signal in the physical resource region according to the value of 1, and if the discovery message of the discovery signal is detected, then the user equipment may stop detecting the discovery message of the discovery signal in the current discovery periodicity, and if the discovery message of the discovery signal is not detected, then the user equipment may further detect a discovery message of the discovery signal in the physical resource region according to the value of 2; if the discovery message of the discovery signal is detected according to the value of 2, then the user equipment may stop detecting the discovery message of the discovery signal in the current discovery periodicity, and if the discovery message of the discovery signal is not detected, then the user equipment may further detect a discovery message of the discovery signal in the physical resource region according to the value of 4; and if the discovery message of the discovery signal is detected according to the value of 4, then the user equipment may stop detecting the discovery message of the discovery signal in the current discovery periodicity, otherwise, the user equipment fails to detect the discovery message of the discovery signal in the current discovery periodicity, that is, the user equipment has not detected the discovery message of the discovery signal in the current discovery periodicity.

Preferably the user equipment can detect the discovery signal in the first detection scheme or the second detection scheme above according to the determined value of the number of discovery resources in one of the following modes:

In a mode A, if the value of the number of discovery resources is 1, then the user equipment may detect the discovery message of the discovery signal separately on each discovery resource in the physical resource region.

For example, if the value of the number of discovery resources of the discovery signal, which is determined corresponding to the third discovery sub-frame in the discovery periodicity is 1, then the user equipment may detect the discovery signal in the third discovery sub-frame in each discovery periodicity.

In a mode B, if the value of the number of discovery resources is M, where M is more than 1, then the user equipment may detect the discovery message of the discovery signal jointly on the M discovery resources in the physical resource region.

As can be apparent from the description above, the user equipment can know the number of discovery resources for the target discovering user equipment to thereby detect the discovery signal according to the number of discovery resources. A gain of information combination can be obtained from the discovery resources, and the need of blind detection for all the possible number of discovery resources can be avoided to thereby lower the complexity of detection.

According to the same technical idea, an embodiment of the invention further provides a user equipment.

Figure 4:
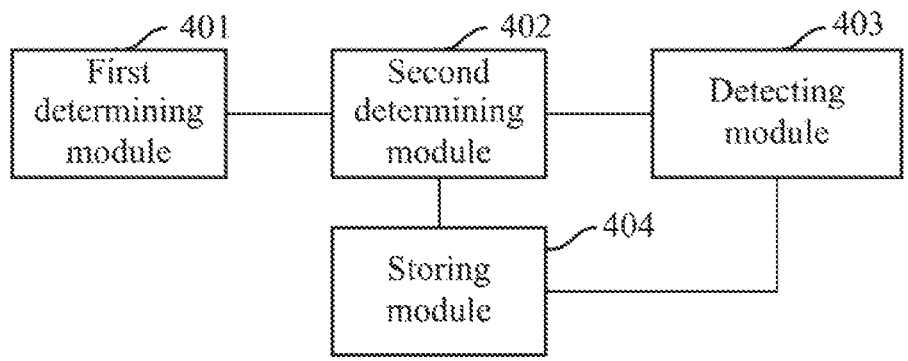
FIG. 4 is a schematic structural diagram of a D2D user equipment according to an embodiment of the invention.

Referring to FIG. 4 which is a schematic structural diagram of a user equipment according to an embodiment of the invention, the user equipment can include a first determining module 401, a second determining module 402, and a detecting module 403, and can further include a storing module 404, where:

The first determining module 401 is configured to determine a physical resource region in which a discovery signal is detected;

The second determining module 402 is configured to determine the number of discovery resources for the discovery signal according to the physical resource region, determined by the first determining module, in which the discovery signal is detected, or according to a set of discovery resources in which a discovery sequence included in the discovery signal is detected in the physical resource region, where the number of discovery resources refers to the number of discovery resources occupied by the same discovery signal transmitted in a discovery periodicity or in the physical resource region; and The detecting module 403 is configured to detect the discovery signal according to the number of discovery resources determined by the second determining module 402.

Particularly the physical resource region refers to a set of sub-frames or a set of sub-bands or a set of PRBs.

Particularly the discovery resources refer to physical resources occupied by the discovery signal transmitted once.

Particularly the storing module 404 can be configured to store a physical resource mapping relationship between the discovery resources occupied by the discovery signal, which is prescribed by a user equipment transmitting the discovery signal if the number of discovery resources of the discovery signal is more than 1.

Particularly the second determining module 402 can be configured to determine the number of discovery resources of the discovery signal in the physical resource region in which the discovery signal is detected according to a correspondence relationship between the number of discovery resources and the physical resource region.

Here the storing module 404 is configured to store the correspondence relationship between the number of discovery resources and the physical resource region; and the correspondence relationship between the number of discovery resources and the physical resource region is notified by a network device to the D2D user equipment in downlink signaling or a broadcast message; or the correspondence relationship between the number of discovery resources and the physical resource region is prescribed by the user equipment and a user equipment transmitting the discovery signal.

Particularly the second determining module 402 can be configured to determine the number of discovery resources in the set of discovery resources in which the discovery sequence included in the discovery signal is detected, as the number of discovery resources for the discovery signal; or if the number of discovery resources in a set of discovery resources in which the discovery sequence included in the discovery signal is detected, is N, to select K values from the values ranging from 1, inclusive, to N, inclusive, and to determine the K values as possible values of the number of discovery resources for the discovery signal, where K is an integer more than or equal to 1 and less than or equal to N, and N is more than 1.

Here the second determining module 402 can be configured to select K values, included in a predefined set S of possible values of the number of discovery resources, from the values ranging from 1, inclusive, to N, inclusive, and to determine the K values as possible values of the number of discovery resources for the discovery signal.

Particularly the detecting module 403 can be configured, if the second determining module determines the number of discovery resources of the discovery signal as a single value, to detect a discovery message of the discovery signal in the physical resource region according to the single value of the number of discovery resources; or if the second determining module determines the number of discovery resources of the discovery signal as a plurality of possible values, to detect the discovery message of the discovery signal in the physical resource region respectively according to each of the possible values.

Here the detecting module 403 can be configured, if the value of the number of discovery resources is 1, to detect the discovery message of the discovery signal separately on each discovery resource in the physical resource region; or if the value of the number of discovery resources is M, where M is more than 1, to detect the discovery message of the discovery signal jointly on the M discovery resources in the physical resource region.

Figure 5:
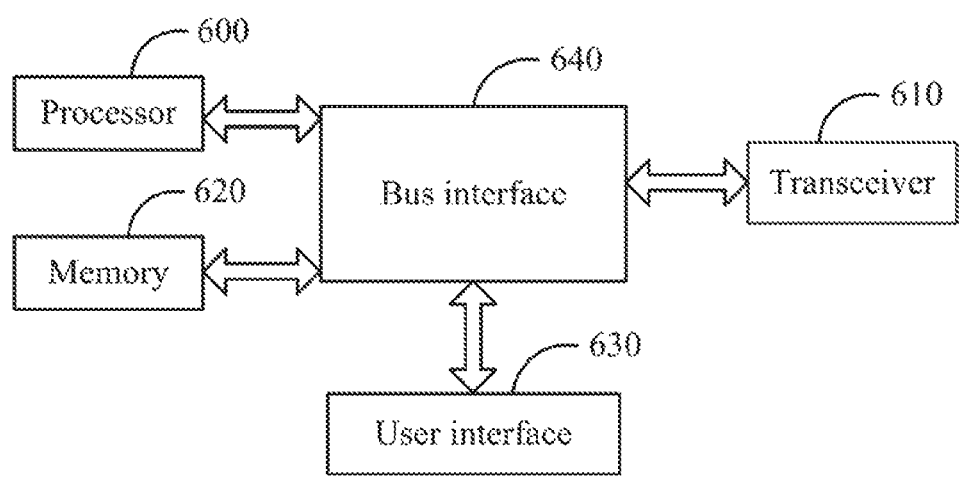
FIG. 5 is a schematic structural diagram of another D2D user equipment according to an embodiment of the invention.

Referring to FIG. 5 which is another schematic structural diagram of a user equipment according to an embodiment of the invention, the user equipment can include:

A processor 600, a memory 620, a transceiver 610, a user interface 630, and a bus interface 640.

The processor 600 is configured to read program in the memory 620 to perform a process including:

Determining a physical resource region in which a discovery signal is detected;

Determining the number of discovery resources for the discovery signal according to the determined physical resource region in which the discovery signal is detected, or according to a set of discovery resources in which a discovery sequence included in the discovery signal is detected in the physical resource region, where the number of discovery resources refers to the number of discovery resources in which the same discovery signal is transmitted in a discovery periodicity or in the physical resource region; and Detecting the discovery signal according to the determined number of discovery resources.

Preferably the physical resource region refers to a set of sub-frames or a set of sub-bands or a set of PRBs.

Preferably the discovery resources refer to physical resources occupied by the discovery signal transmitted once.

Preferably if the number of discovery resources of the discovery signal is more than 1, then the memory 620 is further configured to store a physical resource mapping relationship between the discovery resources occupied by the discovery signal, which is prescribed by a user equipment transmitting the discovery signal.

Preferably the processor 600 configured to determine the number of discovery resources for the discovery signal in the physical resource region in which the discovery signal is detected is configured:

To determine the number of discovery resources of the discovery signal in the physical resource region in which the discovery signal is detected, according to a correspondence relationship between the number of discovery resources and the physical resource region.

Preferably the correspondence relationship between the number of discovery resources and the physical resource region is notified by a network device to the transceiver 610 of the D2D user equipment in downlink signaling or a broadcast message; or the correspondence relationship between the number of discovery resources and the physical resource region is prescribed by the user equipment and a user equipment transmitting the discovery signal.

Particularly the processor 600 configured to determine the number of discovery resources for the discovery signal according to the set of discovery resources in which the discovery sequence included in the discovery signal is detected in the physical resource region is configured:

To determine the number of discovery resources in the set of discovery resources in which the discovery sequence included in the discovery signal is detected, as the number of discovery resources for the discovery signal; or If the number of discovery resources in a set of discovery resources in which the discovery sequence included in the discovery signal is detected, is N, to select K values from the values ranging from 1, inclusive, to N, inclusive, and to determine the K values as possible values of the number of discovery resources for the discovery signal, where K is an integer more than or equal to 1 and less than or equal to N, and N is more than 1.

Preferably the processor 600 configured to select the K values from the values ranging from 1, inclusive, to N, inclusive, and to determine the K values as the possible values of the number of discovery resources for the discovery signal is configured:

To select K values, included in a predefined set S of possible values of the number of discovery resources, from the values ranging from 1, inclusive, to N, inclusive, and to determine the K values as possible values of the number of discovery resources for the discovery signal.

Preferably the processor 600 configured to detect the discovery signal according to the determined number of discovery resources is configured:

If the processor 600 determines the number of discovery resources of the discovery signal as a single value, to detect the discovery message of the discovery signal in the physical resource region based upon the single value of the number of discovery resources; or If the processor 600 determines the number of discovery resources of the discovery signal as a number of possible values, to detect the discovery message of the discovery signal in the physical resource region respectively based upon each of the possible values.

Preferably the processor 600 configured to detect a discovery message of the discovery signal in the physical resource region according to the number of discovery resources is configured:

If the value of the number of discovery resources is 1, to detect the discovery message of the discovery signal separately over each discovery resource in the physical resource region; or If the value of the number of discovery resources is M, where M is more than 1, to detect the discovery message of the discovery signal jointly over the M discovery resources in the physical resource region.

Here in FIG. 6, the bus architecture can include any number of interconnected buses and bridges and particularly link together one or more processors represented by the processor 600, one or more memories represented by the memory 620, and various other circuits. The bus architecture can further link together various other circuits, e.g., peripheral devices, a voltage stabilizer, a power management circuit, etc., and all these circuits are well known in the art, so a further description thereof will be omitted in this context. The bus interface 640 serves as an interface. The transceiver 610 can include a number of elements including a transmitter and a receiver serving as elements configured to communicate with various other devices over a transmission medium. For different user devices, the user interface 60 can also be an interface connected with an internal or external device as needed, and the connected device can include but will not be limited to a keypad, a display, a speaker, a microphone, a joy stick, etc.

The processor 600 is responsible for managing the bus architecture and performing other normal processes, and the memory 620 can store data for use by the processor 600 in performing the operations.

In summary, in the embodiments of the invention, the user equipment can know the number of discovery resources occupied by the discovery target user equipment to thereby detect the discovery signal based upon the number of discovery resources. A gain of information combination can be obtained from the discovery resources, and the need of blind detection for all the possible number of discovery resources can be avoided to thereby lower the complexity of detection.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for detecting a Device to Device (D2D) signal, the method comprising:
   determining, by a user equipment, a physical resource region in which a discovery signal to be detected; wherein the physical resource region is a receive physical resource pool comprising some frequency resources and time resources;
   determining, by the user equipment, a quantity of discovery resources occupied by multiple identical instances of the discovery signal transmitted in a discovery periodicity or in the physical resource region according to the determined physical resource region in which the discovery signal to be detected, wherein each of the discovery resources refers to physical resources occupied by the discovery signal transmitted a single time; and
   detecting, by the user equipment, the discovery signal according to the determined quantity of discovery resources;
   wherein determining, by the user equipment, the quantity of discovery resources occupied by multiple identical instances of the discovery signal transmitted in the discovery periodicity or in the physical resource region according to the physical resource region in which the discovery signal to be detected comprises:
   determining, by the user equipment, the quantity of discovery resources occupied by multiple identical instances of the discovery signal transmitted in the discovery periodicity or in the physical resource region according to a correspondence relationship between the physical resource region and the quantity of discovery resources occupied by multiple identical instances of the discovery signal transmitted in the discovery periodicity or in the physical resource region.

2. The method according to claim 1, wherein the time resources comprised in the receive physical resource pool are a set of sub-frames, and the frequency resources comprised the receive physical resource pool are a set of sub-bands or a set of Physical Resource Blocks (PRBs).

3. The method according to claim 1, wherein if the quantity of discovery resources occupied by multiple identical instances of the discovery signal transmitted in the discovery periodicity or in the physical resource region is more than 1, then the user equipment and a user equipment transmitting the discovery signal prescribe a physical resource mapping relationship between the discovery resources occupied by multiple identical instances of the discovery signal transmitted in the discovery periodicity or in the physical resource region.

4. The method according to claim 1, wherein the correspondence relationship between the physical resource region and the quantity of discovery resources is notified by a network device to the D2D user equipment in downlink signaling or a broadcast message; or the correspondence relationship between the physical resource region and the quantity of discovery resources is prescribed by the user equipment and a user equipment transmitting the discovery signal.

5. The method according to claim 1, wherein detecting, by the user equipment, the discovery signal according to the determined quantity of discovery resources comprises:
   if the user equipment determines the quantity of discovery resources occupied by multiple identical instances of the discovery signal transmitted in the discovery periodicity or in the physical resource region as a single value, then detecting the discovery message of the discovery signal in the physical resource region based upon the quantity of discovery resources which is the single value; or
   if the user equipment determines the quantity of discovery resources occupied by multiple identical instances of the discovery signal transmitted in the discovery periodicity or in the physical resource region as a plurality of possible values, then detecting the discovery message of the discovery signal in the physical resource region respectively based upon each of the possible values.

6. The method according to claim 5, wherein detecting, by the user equipment, a discovery message of the discovery signal in the physical resource region according to the quantity of discovery resources comprises:
   if the value of the quantity of discovery resources occupied by multiple identical instances of the discovery signal is 1, then detecting the discovery message of the discovery signal separately on each discovery resource in the physical resource region; or
   if the value of the quantity of discovery resources occupied by multiple identical instance of the discovery signal is M, wherein M is more than 1, then detecting the discovery message of the discovery signal jointly on the M discovery resources in the physical resource region.

7. A user equipment, comprising a memory and a processor:
   the processor configured to determine a physical resource region in which a discovery signal to be detected; wherein the physical resource region is a receive physical resource pool comprising some frequency resources and time resources;
   to determine a quantity of discovery resources occupied by multiple identical instances of the discovery signal transmitted in a discovery periodicity or in the physical resource region according to the determined physical resource region in which the discovery signal to be detected, wherein each of the discovery resources refers to physical resources occupied by the discovery signal transmitted a single time; and
   to detect the discovery signal according to the determined quantity of discovery resources;
   wherein the processor is configured to determine the quantity of discovery resources occupied by multiple identical instances of the discovery signal transmitted in the discovery periodicity or in the physical resource region according to a correspondence relationship between the physical resource region and the quantity of discovery resources occupied by multiple identical instances of the discovery signal transmitted in the discovery periodicity or in the physical resource region.

8. The user equipment according to claim 7, wherein the time resources comprised in the receive physical resource pool are a set of sub-frames, and the frequency resources comprised in the receive physical resource pool are a set of sub-bands or a set of Physical Resource Blocks (PRBs).

9. The user equipment according to claim 7, wherein the memory is configured to:
store a physical resource mapping relationship between the discovery resources occupied by multiple identical instances of the discovery signal transmitted in the discovery periodicity or in the physical resource region, which is prescribed by a user equipment transmitting the discovery signal if the quantity of discovery resources occupied by multiple identical instances of the discovery signal transmitted in the discovery periodicity or in the physical resource region is more than 1.

10. The user equipment according to claim 7, wherein the memory is configured to:
store the correspondence relationship between the physical resource region and the quantity of discovery resources, wherein the correspondence relationship between the physical resource region and the quantity of discovery resources is notified by a network device to the D2D user equipment in downlink signaling or a broadcast message; or the correspondence relationship between the physical resource region and the quantity of discovery resources is prescribed by the user equipment and a user equipment transmitting the discovery signal.

11. The user equipment according to claim 7, wherein the processor is configured, if the processor determines the quantity of discovery resources occupied by multiple identical instances of the discovery signal transmitted in the discovery periodicity or in the physical resource region as a single value, to detect a discovery message of the discovery signal in the physical resource region according to the quantity of discovery resources which is the single value; or
if the processor determines the quantity of discovery resources occupied by multiple identical instances of the discovery signal transmitted in the discovery periodicity or in the physical resource region as a plurality of possible values, to detect the discovery message of the discovery signal in the physical resource region respectively according to each of the possible values.

12. The user equipment according to claim 11, wherein the processor is configured, if the value of the quantity of discovery resources occupied by multiple identical instances of the discovery signal is 1, to detect the discovery message of the discovery signal separately on each discovery resource in the physical resource region; or
if the value of the quantity of discovery resources occupied by multiple identical instances of the discovery signal is M, wherein M is more than 1, to detect the discovery message of the discovery signal jointly on the M discovery resources in the physical resource region.

* * * * *